(12) United States Patent
Foo (10) Patent No.: US 7,784,694 B2
(45) Date of Patent: Aug. 31, 2010

(54) REFLECTIVE ENCODER WITH LENS ON CODE STRIP

(75) Inventor: Siang Leong Foo, Lorong (MY)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 392 days.

(21) Appl. No.: 11/285,647

(22) Filed: Nov. 21, 2005

(65) Prior Publication Data

US 2007/0114283 A1 May 24, 2007

(51) Int. Cl.
*G06K 7/10* (2006.01)
(52) U.S. Cl. .................. 235/454; 235/456; 250/231.13; 359/520; 359/522
(58) Field of Classification Search .................. 235/454, 235/456; 250/231.13; 359/520, 522
See application file for complete search history.

(56) References Cited

U.S. PATENT DOCUMENTS

| | | | | |
|---|---|---|---|---|
| 4,765,656 A | * | 8/1988 | Becker et al. ................. | 283/70 |
| 5,317,149 A | * | 5/1994 | Uebbing et al. ........ | 250/231.14 |
| 5,880,885 A | * | 3/1999 | Bailey et al. ................. | 359/529 |
| 6,653,619 B2 | * | 11/2003 | Chin et al. ............. | 250/231.13 |
| 2005/0087681 A1 | * | 4/2005 | Chin et al. ............. | 250/231.13 |
| 2006/0138235 A1 | * | 6/2006 | Wei ............................ | 235/454 |

* cited by examiner

*Primary Examiner*—Daniel A Hess
*Assistant Examiner*—Rafferty Kelly (57) ABSTRACT

An encoder that includes a code strip and an emitter-detector module is disclosed. The code strip has alternating reflective and opaque stripes and an imaging element in contact with a surface of the code strip. The optical element directs light incident thereon to the code strip. The emitter-detector module includes a light source that generates light and directs a portion of the generated light to the imaging element. The emitter-detector module also includes a photodetector that generates a signal representing an intensity of light received by the photodetector. The imaging element images light reflected from the code strip onto the photodetector. The imaging element can include a lens having a planar surface in contact with the surface of the code strip. The imaging element can be structured such that the imaging element collimates light from the light source such that collimated light is incident on one of the reflective stripes.

6 Claims, 7 Drawing Sheets

REFLECTIVE ENCODER WITH LENS ON CODE STRIP

BACKGROUND OF THE INVENTION

Encoders provide a measurement of the position of a component in a system relative to some predetermined reference point. Encoders are typically used to provide a closed-loop feedback system to a motor or other actuator. For example, a shaft encoder outputs a digital signal that indicates the position of the rotating shaft relative to some known reference position that is not moving. A linear encoder measures the distance between the present position of a moveable carriage and a reference position that is fixed with respect to the moveable carriage as the moveable carriage moves along a predetermined path.

Optical encoders utilize a light source and a photo detector to measure changes in the position of an encoding disk or strip. In a transmissive encoder, the encoding disk includes a series of alternating opaque and transparent strips. The light source is located on one side of the code strip, and the photodetector is located on the other side of the encoding strip. The light source and photodetector are fixed relative to one another, and the code strip moves between the photodetector such that the light reaching the photodetector is interrupted by the opaque regions of the code strip. The position of the code strip is determined by measuring the transitions between the light and dark regions observed by the photodiode.

In a reflective encoder, the light source and photodetector are located on the same side of the encoding strip, and the encoding strip consists of alternating reflective and absorbing stripes. The light source is positioned such that light from the light source is imaged into the detector when the light is reflected from the reflective strips.

Transmissive encoders have a number of advantages over reflective encoders in terms of tolerance and contrast ratios. In a reflective encoder, the distance between the code strip and the detector is critical as either the code strip itself or the light source as seen in the reflected light from the code strip is imaged into the detector. Hence, if there is an error in the code strip to detector distance, the image will be out of focus and errors will result. In addition, the code strips for reflective encoders have a contrast ratio determined by the ratio of the reflectance of the reflective and absorptive regions. This ratio tends to be less than the ratio of the absorbance of the clear and opaque regions of a transmissive code strip. In addition, the cost of a transmissive code strip is significantly less than that of a reflective code strip.

In a transmissive encoder, the light from the light source is collimated before it reaches the code strip, and hence, the light leaving the code strip is also collimated. The detection assembly needs only to image this collimated light onto the detector surface. Hence, the only critical distance is the distance from the imaging lens to the detector, which can be tightly controlled by the detector manufacturer independent of the specific encoder assembly.

Unfortunately, transmissive recorders require that two separate components, the light source and photodetector, be mounted and aligned with one another at the time of assembly of the encoder. Reflective encoders, in contrast, are constructed from a single emitter-detector element that is packaged together with the various optical components for imaging the light source onto the photodetector. This reduces the cost of assembly.

Reflective encoders, however, have significantly worse signal-to-noise ratios due to the internal reflection of the light source within the source-detector module. In a reflective encoder, the light source and detector are encapsulated together in a transparent material that also provides the lens functions needed to illuminate the code wheel in the desired manner and to image the light onto the detector. Part of the light generated by the light source is reflected at the encapsulation-air boundary back toward the detector. This light forms a background that is independent of the code wheel, and hence, lowers the signal-to-noise ratio of the encoder.

SUMMARY OF THE INVENTION

The present invention is an encoder that includes a code strip and an emitter-detector module. The code strip has alternating reflective and opaque stripes and an imaging element in contact with a surface of the code strip. The optical element directs light incident thereon to the code strip. The emitter-detector module includes a light source that generates light and directs a portion of the generated light to the imaging element. The emitter-detector module also includes a photodetector that generates a signal representing an intensity of light received by the photodetector. The imaging element images light reflected from the code strip onto the photodetector. In one aspect of the invention, the imaging element includes a lens having a planar surface in contact with the surface of the code strip. The imaging element can be structured such that the imaging element collimates light from the light source such that collimated light is incident on one of the reflective stripes. Imaging elements in the form of cylindrical lenses or the circular analog thereof can be utilized.

DETAILED DESCRIPTION OF THE PREFERRED EMBODIMENTS OF THE INVENTION

Figure 1:
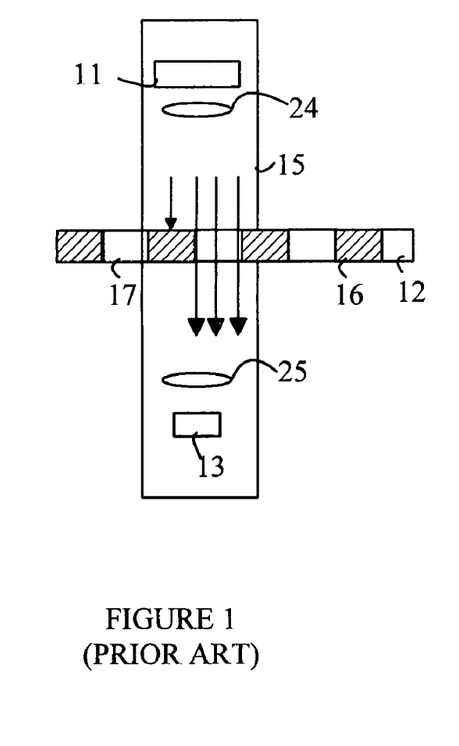
FIG. 1 illustrates a transmissive encoder.
Figure 2:
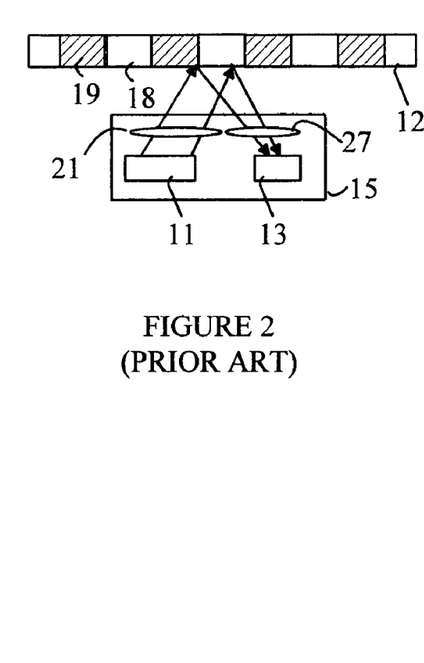
FIG. 2 illustrates one type of reflective encoder.
Figure 3:
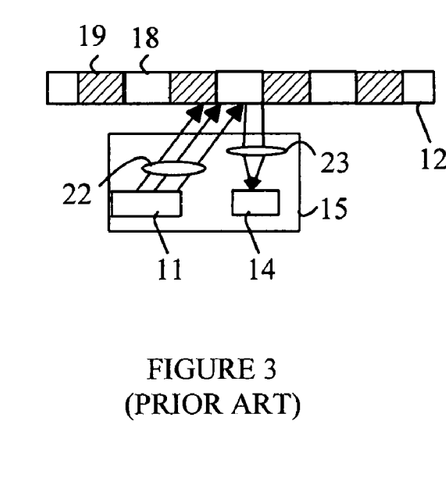
FIG. 3 illustrates another form of imaging encoder.

Refer now to FIGS. 1-3, which illustrate some typical encoder designs. The encoder can be divided into an emitter/detector module 15 and a code wheel or code strip. Module 15 includes an emitter 11 that illuminates a portion of the code strip 12. The illuminated code strip is viewed by a detector 13. The emitter typically utilizes an LED as the light source. The detector is typically based on one or more photodiodes. FIG. 1 illustrates a transmissive encoder. In transmissive encoders, the light from the emitter is collimated into a parallel beam by a collimating optic such as lens 24. Code strip 12 includes opaque stripes 16 and transparent stripes 17. When code strip 12 moves between emitter 11 and detector 13, the light beam is interrupted by the opaque stripes on the code strip. The photodiodes in the detector receive flashes of light. The resultant signal is then used to generate a logic signal that transitions between logical one and logical zero.

The detector can include an imaging lens 25 that images the collimated light onto the photodiode. Lens 25 can be used to adjust the size of the light stripes to match the size of the photodiode or photodiodes in the detector. When used in this manner, the photodetector is placed at a point between the code strip and the focal point of lens 25. The distance between the photodetector and the lens determines the size of the code strip image on the photodetector.

In general, a transmissive encoder is constructed from two separate sub-modules that are provided to the manufacturer of the encoder. The first sub-module includes the light source consisting of emitter 11 and lens 24. The second sub-module consists of photodetector 13 and lens 25. Since the light is collimated, the only critical distances are those between emitter 11 and lens 24 and between lens 25 and photodetector 13. These distances can be controlled to a high level of precision by the sub-module manufacturer. Hence, the tolerances that need to be maintained by the encoder manufacturer are substantially reduced in transmissive designs. However, transmissive encoders are more expensive from the point of view of the entity assembling the encoder, since two sub-modules must be mounted and aligned.

FIG. 2 illustrates one type reflective encoder. In reflective encoders, the code strip includes reflective stripes 18 and absorptive stripes 19. The emitter includes an optical system such as a lens 21 that images the emitter light source into the detector when the light strikes a reflective stripe on the code strip. The light from the emitter is reflected or absorbed by the stripes on the code strip. The output from the photodetector is again converted to a logic signal. In embodiments in which the photodetector includes a plurality of photodiodes that provide a signal that depends on matching an image of the strips to the photodiodes, a second lens 27 can be included to adjust the size of the code strip image to the size of the photodetectors in a manner analogous to that described above.

FIG. 3 illustrates another form of imaging encoder. An imaging encoder operates essentially the same as the reflective encoder described above, except that module 15 includes imaging optics 23 that form an image of the illuminated code strip on the detector 14. In addition, the light source is processed by lens 22 such that the code strip is uniformly illuminated in the region imaged onto the detector.

Figure 4:
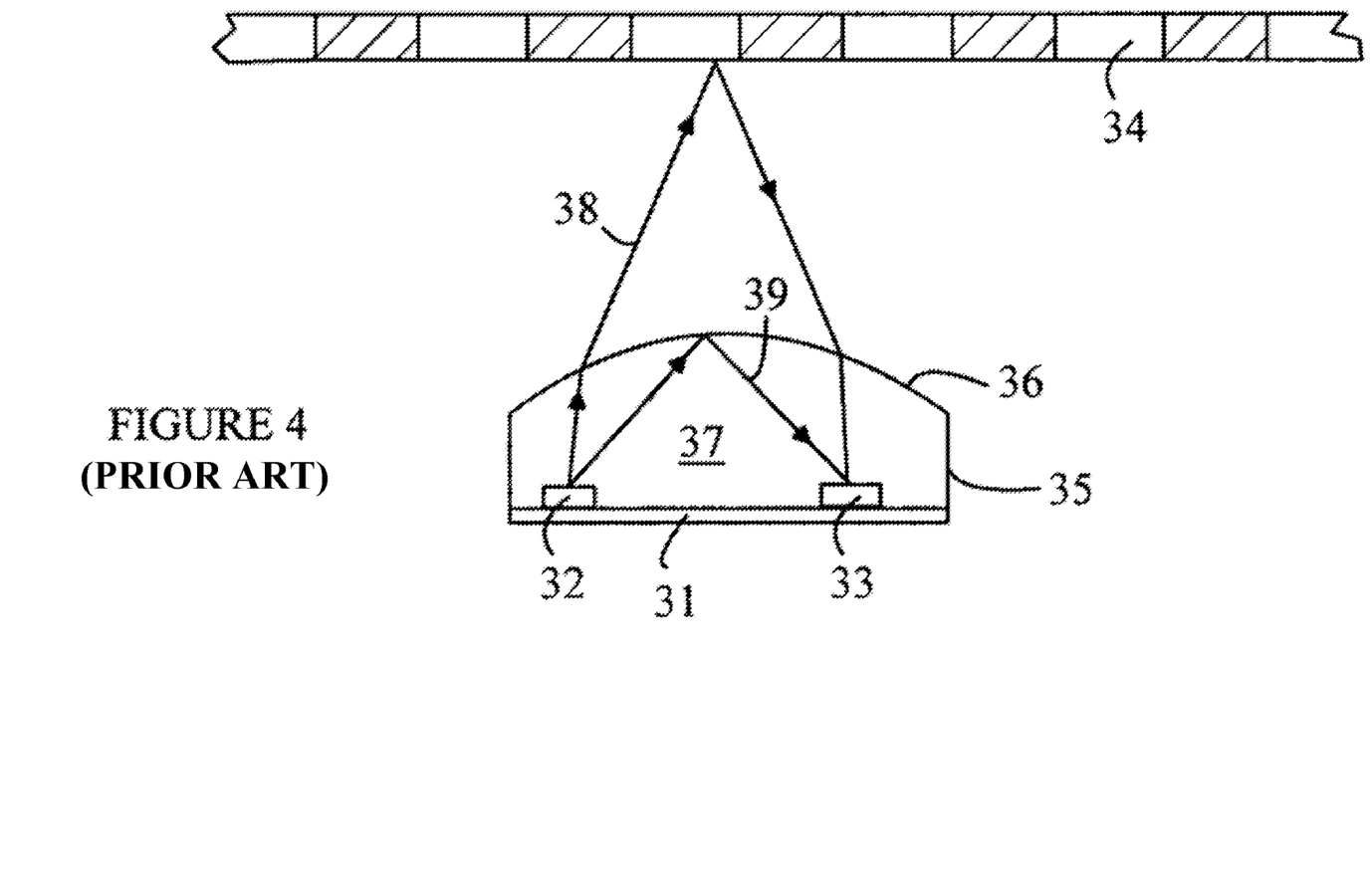
FIG. 4 illustrates a typical reflective encoder layout.

Refer now to FIG. 4, which illustrates a typical reflective encoder layout. The code wheel 34 is illuminated with light from emitter-detector module 37 that includes an LED 32 and a photodetector 33 that are mounted on a substrate 31. Photodetector 33 includes one or more photodiodes. The number of photodiodes depends on the particular encoder design. These components are encapsulated in a clear epoxy layer 35 having a top surface that is molded to provide a lens that images the light from LED 32 that is reflected from code wheel 34 onto photodetector 33. A ray of the imaged light source is shown at 38.

The clear epoxy encapsulant has an index of refraction that is greater than that of the surrounding air. As a result, light striking surface 36 at angles greater than the critical angle is reflected back into the emitter-detector module as shown at 39. Some of this light strikes photodetector 33 directly. Some of the reflected light bounces off of the walls of the emitter-detector module and also reaches photodetector 33. The amount of light reaching photodetector 33 in this manner is independent of the light reflected from code wheel 34, and hence, forms a constant background illumination that reduces the signal-to-noise ratio of photodetector 33.

The significance of this background light depends on the size and resolution of the encoder. The amount of light that is reflected from code wheel 34 depends on the size of the reflective stripes on the code wheel. In very high-resolution encoders, these stripes are small, and hence, the amount of reflected light is also small. Similarly, many applications require physically small encoders due to space constraints. Here again, the size of the reflective stripes is small. When the reflected light from the code wheel at the photodiode has an intensity that is similar to that of the background light from the internal reflections at surface 36, the encoder will not perform properly.

Figure 5:
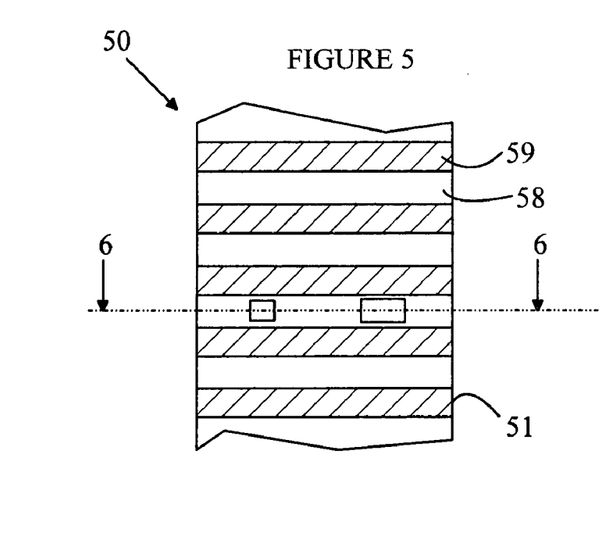
FIG. 5 is a top view of encoder 50.
Figure 6:
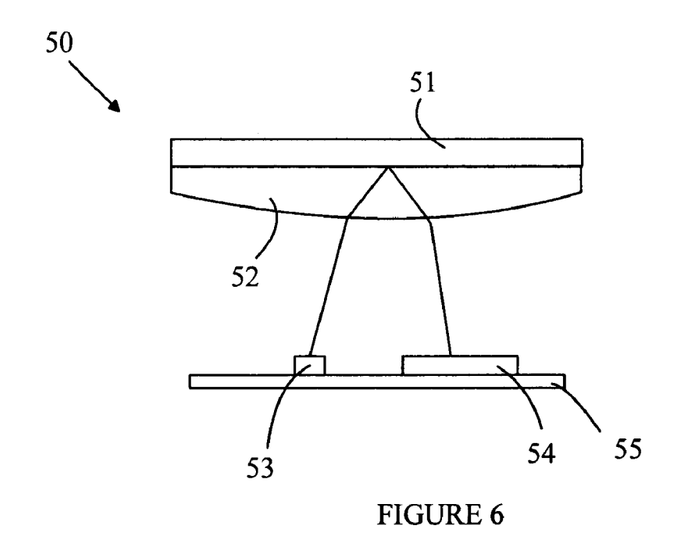
FIG. 6 is a cross-sectional view of encoder 50 through line 6-6 shown in FIG. 5.
Figure 7:
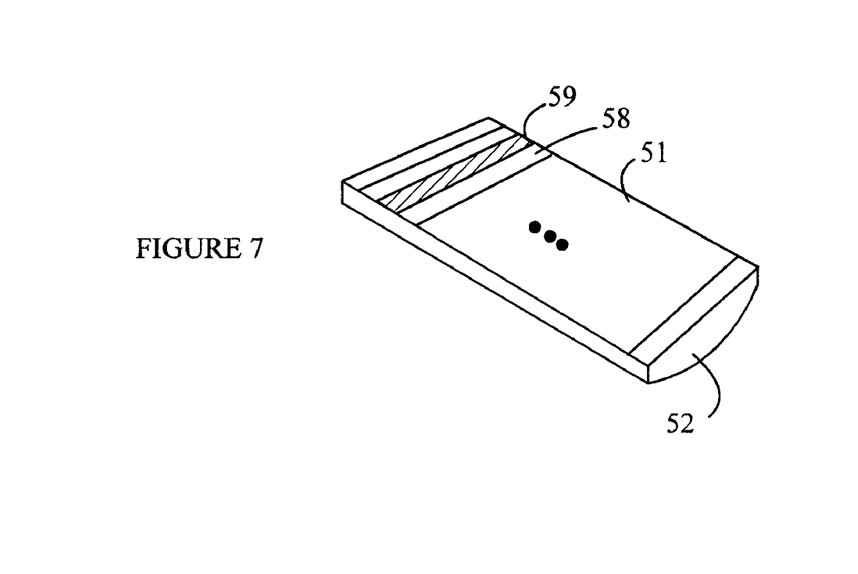
FIG. 7 is a perspective view of code strip 51.

The present invention avoids this background light problem by moving the optical system to the code strip or code wheel. Refer now to FIGS. 5-7, which illustrate an encoder according to one embodiment of the present invention. FIG. 5 is a top view of encoder 50, and FIG. 6 is a cross-sectional view of encoder 50 through line 6-6 shown in FIG. 5. FIG. 7 is a perspective view of code strip 51. To simply the drawings and discussion, encoder 50 is shown as a linear encoder. However, circular encoders can also be constructed using the teachings of the present invention.

Encoder 50 includes a code strip 51 having alternating reflective and opaque stripes shown respectively at 58 and 59. The code strip is illuminated by a light source 53. When a reflective strip is positioned over the emitter-detector module 55 comprising light source 53 and photodetector 54, light is reflected into photodetector 54. Code wheel 51 also includes an optical element 52 that directs the light from light source 53 onto the reflective stripes and images the reflected light back onto photodetector 54.

Optical element 52 can be fabricated by molding the optical element to the code strip. For example, a clear epoxy resin can be molded to the code strip after the reflective and opaque stripes have been placed on the code strip.

Any reflections resulting from the internal reflection of light at the air-optical element boundary reflect light back toward the code strip, and not into the photodetector. Hence, this arrangement substantially reduces the background light signal discussed above.

Figure 8:
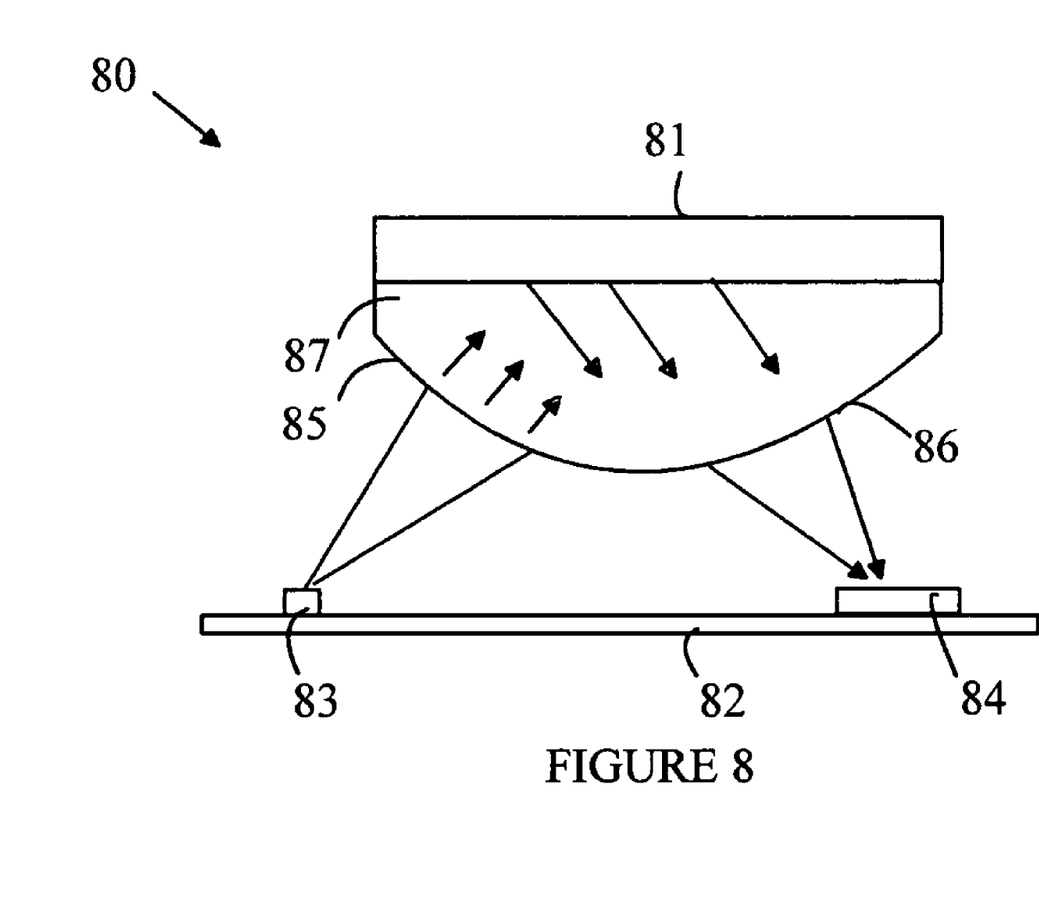
FIG. 8 illustrates another embodiment of an encoder according to the present invention.

In one embodiment, the optical element is shaped such that light from light source 53 is collimated by the optical element before the light strikes the reflective stripes of the code strip. Refer now to FIG. 8, which illustrates another embodiment of an encoder according to the present invention. Encoder 80 has a code strip 81 that includes an imaging element 87 having a first region 85 that collimates the light from light source 83 such that the light is collimated when it strikes the surface of the code strip. The light reflected from code strip 81 is imaged by region 86 onto photodetector 84 of emitter-detector module 82.

In some encoder designs such as multi-channel encoders, the image of one or more stripes on the code strip is generated on the photodetector. In this case, the photodetector is placed above the focal point of the imaging region 86 by an amount that provides the desired magnification or demagnification of the code strip image.

Figure 9:
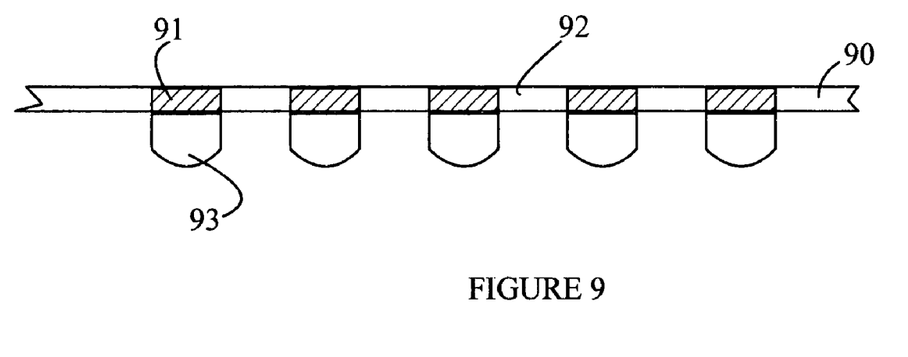
FIG. 9 is a cross-sectional view of code strip 90 through line 9-9 shown in FIG. 10.
Figure 10:
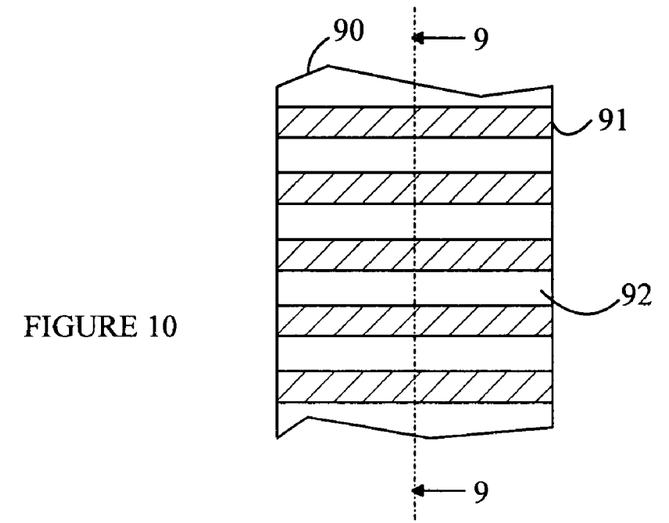
FIG. 10 is a top view of code strip 90.

In the above-described embodiments, the optical element attached to the code strip is a cylindrical lens. Such lens only focus in the dimension perpendicular to the axis of the cylinder. In some applications, the unfocused light can cause problems if the range of emission angles from the light source is too large. This can be avoided by utilizing a lens that focuses in both directions. Refer now to FIGS. 9 and 10, which illustrate a code strip 90 according to another embodiment of the present invention. FIG. 10 is a top view of code strip 90, and FIG. 9 is a cross-sectional view of code strip 90 through line 9-9 shown in FIG. 10. Code strip 90 includes a lens 93 over each reflective stripe 91. Lens 93 focuses light both in the direction parallel to line 9-9 and in the direction perpendicular thereto. Since no lens is provided over the opaque areas shown at 92, this arrangement has the additional advantage of increasing the contrast between the reflective and opaque regions of the code strip.

Figure 11:
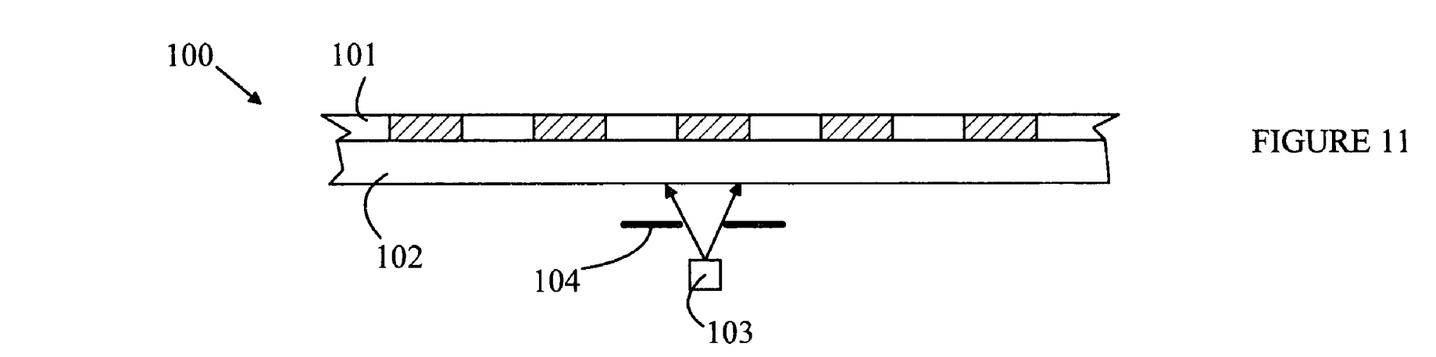
FIG. 11 is a cross-sectional view of an encoder 100 having a code strip with a cylindrical lens attached thereto.

Another method for limiting problems resulting from too large a range of angles is to collimate the light in the direction perpendicular to the axis of the code strip lens. The collimator can be incorporated in the light source or on the code strip itself. Refer now to FIG. 11, which is a cross-sectional view of an encoder 100 having a code strip 101 with a cylindrical lens 102 attached thereto. Code strip 101 is illuminated by a light source 103. A collimating slit 104 is used to limit the cone of angles from light source 101 in the direction perpendicular to the axis of lens 102.

Figure 12:
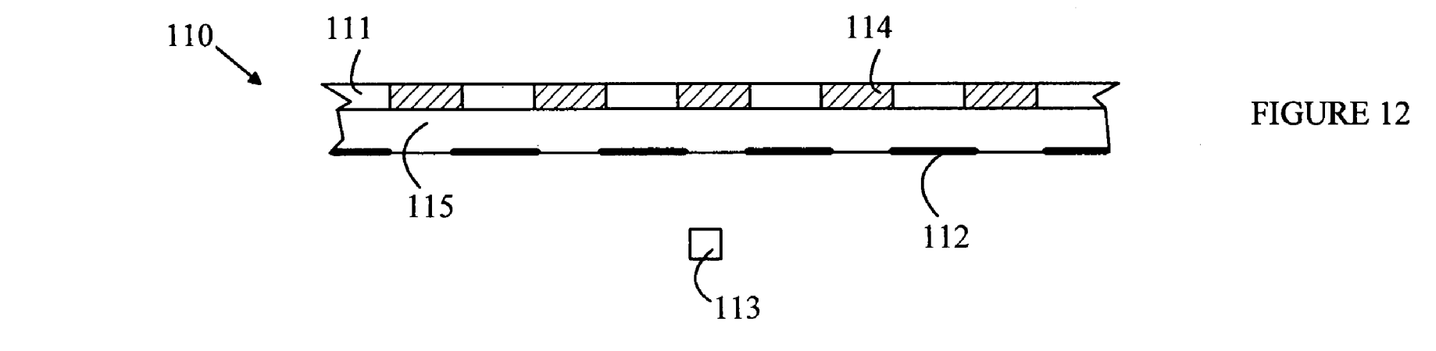
FIG. 12 is a cross-sectional view of an encoder 110 having a code strip with a cylindrical lens attached thereto.

An embodiment in which the collimating slit is incorporated in the cylindrical lens is shown in FIG. 12. FIG. 12 is a cross-sectional view of an encoder 110 having a code strip 111 with a cylindrical lens 115. Lens 115 includes opaque stripes 112 that limit the spread of the light from light source 113 in the direction perpendicular to the axis of the lens. This arrangement is useful in encoders in which the thickness of lens 115 is a significant fraction of the distance from light source 113 to the reflective stripes 114 on the code strip.

Figure 13:
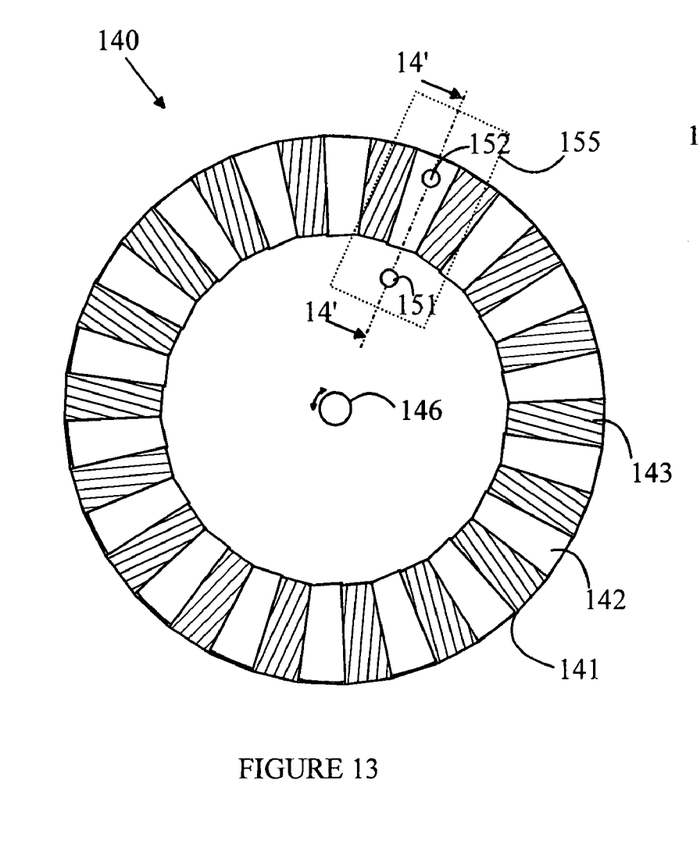
FIG. 13 is a top view of encoder 140.
Figure 14:
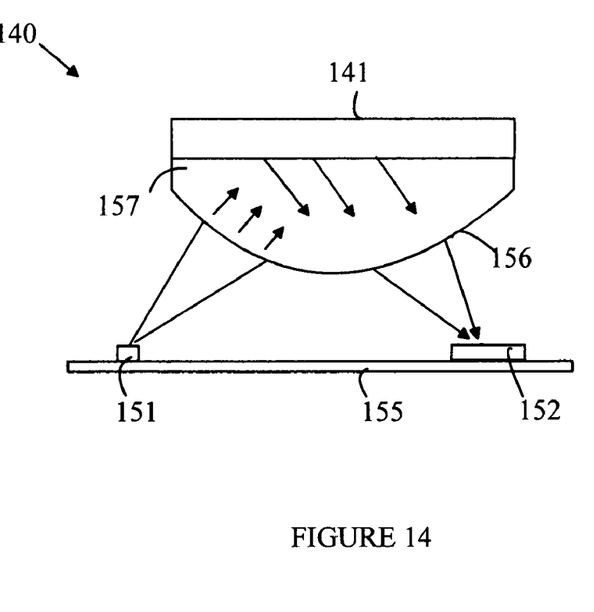
FIG. 14 is a cross-sectional view of encoder 140 through line 14'-14' shown in FIG. 13.

The above-described embodiments of the present invention have been directed to linear encoders. However, the present invention can also be used to construct other forms of encoders. Refer now to FIGS. 13 and 14, which illustrate a shaft encoder that utilizes a circular code strip. FIG. 13 is a top view of encoder 140, and FIG. 14 is a cross-sectional view of encoder 140 through line 14'-14' shown in FIG. 13. Encoder 140 utilizes a circular code strip 141 having alternating reflective and absorptive stripes 143 and 142, respectively. The bottom surface of code strip 141 includes a lens 157. The code strip is illuminated by an emitter-detector module 155 having a light source 151 and a photodetector 152 in a manner analogous to that described above with reference to FIG. 8. Lens 156 has a surface defined by rotating curve 156 around a circle centered on the center of the code strip. The code strip has a center coincident with that of shaft 146 whose position is encoded by encoder 140.

Various modifications to the present invention will become apparent to those skilled in the art from the foregoing description and accompanying drawings. Accordingly, the present invention is to be limited solely by the scope of the following claims.

What is claimed is:

1. An encoder comprising:
   a code strip comprising alternating reflective and opaque stripes;
   an imaging element in direct, physical contact with a surface of said code strip, said imaging element directing light incident thereon to said code strip; and
   an emitter-detector module comprising a light source that generates light and directs a portion of said generated light to said imaging element and a photodetector that generates a signal representing an intensity of light received by said photodetector,
   wherein said imaging element images light reflected from said code strip onto said photodetector; and
   wherein said imaging element collimates said portion of said light such that collimated light is incident on one of said reflective stripes.

2. The encoder of claim 1 wherein said imaging element comprises a lens having a planar surface in contact with said surface of said code strip.

3. The encoder of claim 1 wherein said code strip is a linear code strip and wherein said imaging element comprises a cylindrical lens.

4. The encoder of claim 1 wherein said code strip is a circular code strip characterized by a center and wherein said imaging element comprises a transparent extrusion defined by rotating an area about said center, said reflective stripes being in contact with said transparent extrusion.

5. The encoder of claim 1 wherein said code strip moves relative to said emitter-detector module in a travel direction and wherein said imaging element comprises opaque regions for limiting the illumination of said reflective stripes in a direction parallel to said travel direction.

6. The encoder of claim 1 wherein said code strip moves relative to said emitter-detector module in a travel direction and wherein said emitter-detector module comprises an aperture for limiting the illumination of said reflective stripes in a direction parallel to said travel direction.

* * * * *